Patented Aug. 22, 1933

1,923,497

UNITED STATES PATENT OFFICE 1,923,497

PURIFYING OF NATURAL HEAVY SPAR

Johannes Müller, Homberg - on - the - Lower - Rhine, Germany, assignor to "Sachtleben" Aktiengesellschaft fur Bergbau und Chemische Industrie, Homberg - on - the - Lower - Rhine, Germany, a German Company No Drawing. Application May 6, 1929, Serial No. 360,987, and in Germany July 30, 1928

8 Claims. (Cl. 23—122)

The object of the invention is a method of completely purifying natural spar containing impurities, by simple means.

It is known that the impurities which color many kinds of spar, consist preferably of aluminium-, iron- and manganese oxides, as well as peroxides or also salts of these metals. Besides these, there are spars, which in addition to iron oxide, also contain bitumen as impurity. In order to remove the metallic impurities from spars free from bitumen, the methods hitherto adopted were either to heat the ground spar with mineral acids, in which case the said metal oxides passed practically into solution and were removed by washing, or the spar was mixed with sodium bisulphate, the mixture roasted below sintering temperature and leached out. In the case of spars containing bitumen however, these methods were unsuccessful.

A method has been found which can be used both for spars containing bitumen and those free from bitumen. It has the advantage that the bitumen-containing spar need not be finely ground, but can be calcined with a reducing action in more or less large pieces at a temperature of 1300–1350° C., in which case if desired further reducing measures can also be applied. In general it is sufficient if the calcination for reducing purposes is carried out for a short period of time. In such a case small quantities of barium sulphide are formed, owing to the bitumen contained as a natural admixture and also owing to the excess of reducing gases. The surprising observation has been made that these small amounts of barium sulphide, when the glowing spar is quenched in water, immediately convert the said metal oxides, chiefly the coloring constituents, such as iron oxide, manganese oxide etc., into metal sulphides. At the same time by this treatment the spar is considerably loosened, so that the very dilute barium sulphide liquor formed, penetrates through the pieces of spar and at once converts the metal oxides.

The sulphides formed in this way can for the most part be removed by simply washing out with water. In order to be able to extract the sulphides which are not removed thus, the spar is finely ground, preferably in the wet state, and then treated with a small quantity of mineral acid, e. g. sulphuric acid. The acid decomposes the sulphides and converts them into water-soluble form, whereupon they can be readily washed out. It is thus no longer necessary to purify the spar by prolonged boiling with acid, as the metal sulphides immediately decompose and only require to be washed out. The pure white spar is then dried.

A particular advantage of the method consists amongst other things, in this that in the aforedescribed treatment, the quartz which is present in most spars, is simultaneously changed in such a way that during the subsequent washing and acid process it passes completely into solution, so that a perfectly pure $BaSO_4$ is formed from normal spars.

According to the present method it is also possible to bleach spar, free from bitumen, in a simple way. For this purpose it is suitably granulated, mixed thoroughly with 0.5–1% of material containing bitumen or carbon in general, preferably with coals, thereupon calcined also for a short time at 1300–1350° C. and further treated as given above.

The calcined spar can also be quenched in dilute solutions containing sulphide in order to complete the formation of the heavy metal sulphides. The further working up and also the method of procedure is the same as described above.

Examples

Example 1.—10 kgs. of lump spar containing bitumen are calcined for a short time at 1300–1350° C. and the same thereupon quenched in water, the metal sulphides separated from the spar being removed by washing. After grinding in the wet state, the residual sulphides are decomposed by the addition of 30–50 ccms. conc. sulphuric acid 1.84, the spar becoming immediately white and being dried after washing.

Example 2.—10 kgs. natural crude spar free from bitumen and ground to the fineness of dust are thoroughly mixed with 50–80 grms. finely ground coals, and calcined for a short time at 1300–1350° C., thereupon quenched, finely ground in the wet state and the metal sulphides decomposed with 30–50 ccms. conc. sulphuric acid 1.84, whereupon the pure white spar is dried after washing.

What I claim is:—

1. A method of purifying natural heavy spar, consisting in calcining under reducing conditions lump spar at 1300–1350° C. whereby small amounts of barium sulphide are produced, quenching the same and removing the metal sulphides formed.

2. A method of purifying natural heavy spar, consisting in grinding spar, mixing the same with small amounts of a material containing carbon, calcining the said spar under reducing conditions at 1300–1350° C. whereby small amounts of barium sulphide are produced, quenching the same and removing the metal sulphides formed.

3. A method of purifying natural heavy spar, consisting in calcining under reducing conditions lump spar at 1300-1350° C., whereby small amounts of barium sulphide are produced, quenching the same, washing the said spar to remove the greater portion of the metal sulphides formed, finely grinding the spar in the wet state, and thereupon treating the same with a small amount of mineral acid.

4. A method of purifying natural heavy spar, consisting in grinding spar, mixing the same with small amounts of a material containing carbon, calcining the said spar under reducing conditions at 1300-1350° C., whereby small amounts of barium sulphide are produced, quenching the same, washing the said spar to remove the greater portion of the metal sulphides formed, finely grinding the spar in the wet state, and thereupon treating the same with a small amount of mineral acid.

5. A method of purifying natural heavy spar, consisting in calcining under reducing conditions lump spar at 1300-1350° C., whereby small amounts of barium sulphide are produced, quenching the same in dilute solutions containing sulphide and removing the metal sulphides formed.

6. A method of purifying natural heavy spar, consisting in grinding spar, mixing the same with small amounts of a material containing carbon, calcining the said spar under reducing conditions at 1300-1350° C., whereby small amounts of barium sulphide are produced, quenching the same in dilute solutions containing sulphide and removing the metal sulphides formed.

7. A method of purifying natural heavy spar, consisting in calcining under reducing conditions lump spar at 1300-1350° C., whereby small amounts of barium sulphide are produced, quenching the same in dilute solutions containing sulphide, washing the said spar to remove the greater portion of the metal sulphides formed, finely grinding the spar in the wet state, and thereupon treating the same with a small amount of mineral acid.

8. A method of purifying natural heavy spar, consisting in grinding spar, mixing the same with small amounts of a material containing carbon, calcining the said spar under reducing conditions at 1300-1350° C., whereby small amounts of barium sulphide are produced, quenching the same in dilute solutions containing sulphide, washing the said spar to remove the greater portion of the metal sulphides formed, finely grinding the spar in the wet state, and thereupon treating the same with a small amount of mineral acid.

JOHANNES MÜLLER.